United States Patent [19]

Meyer et al.

[11] Patent Number: 4,992,199
[45] Date of Patent: Feb. 12, 1991

[54] PROCESS FOR PAINT DETACKIFYING AND SEDIMENTATION

[75] Inventors: Arnold Meyer, St. Michaelisdonn; Klaus F. Noweck, Brunsbuttel; Jan L. Schiefler, Hamburg, all of Fed. Rep. of Germany; Anders Svensson, Vaxjo, Sweden

[73] Assignee: Condea Chemie GmbH, Brunsbuttel, Fed. Rep. of Germany

[21] Appl. No.: 352,294

[22] Filed: May 16, 1989

[30] Foreign Application Priority Data

May 20, 1988 [DE] Fed. Rep. of Germany ....... 3817251

[51] Int. Cl.$^5$ .......................... C23D 17/00; B08B 7/00; C11D 7/00
[52] U.S. Cl. .................................... 252/180; 252/145; 252/144; 252/147; 252/DIG. 8; 134/38; 106/404; 106/407
[58] Field of Search ................. 252/DIG. 8, 180, 145, 252/144, 147; 134/38; 106/404, 467

[56] References Cited

U.S. PATENT DOCUMENTS

| | | | |
|---|---|---|---|
| 3,982,955 | 9/1976 | Mansmann et al. | 106/307 |
| 4,010,247 | 3/1977 | Wassermann et al. | 423/626 |
| 4,504,395 | 3/1985 | Harpel et al. | 210/712 |
| 4,564,464 | 1/1986 | Harpel et al. | 252/181 |
| 4,686,047 | 8/1987 | Arots | 210/712 |
| 4,759,855 | 7/1988 | Kaiser | 210/712 |
| 4,861,491 | 8/1989 | Svennsson | 210/691 |

Primary Examiner—Paul Lieberman
Assistant Examiner—James M. Silbermann
Attorney, Agent, or Firm—Collard, Roe & Galgano

[57] ABSTRACT

A composition for use as a paint detackifying and sedimentation agent is disclosed, which includes 60 to 80% by weight of alumina $Al_2O_3$) in pseudoboehmite or boehmite form, either in X-ray amorphous form or with a crystallite size of 20 to 150 A. The composition of the invention may include foam inhibitors, or other conventional additives. A process for use of the composition of the invention is also disclosed in which the composition is added as a 5–30% aqueous dispersion or in dry form to the circulating water of a paint spraying booth and used in a quantity of 1 to 10% by weight, based on 1 kg of the paint to be detackified.

5 Claims, 1 Drawing Sheet

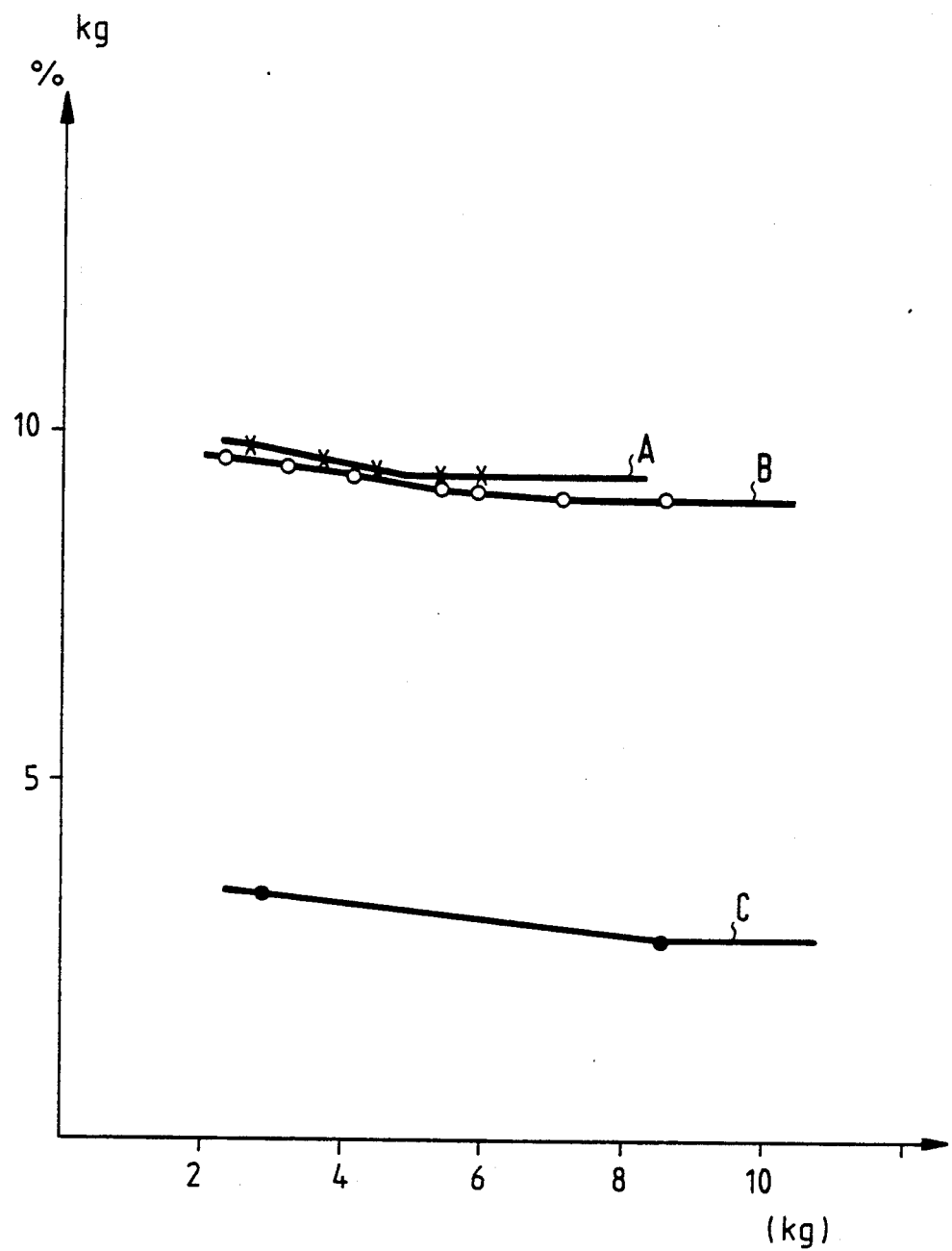

PROCESS FOR PAINT DETACKIFYING AND SEDIMENTATION

The present invention relates to a novel paint detackifying and sedimentation agent.

In the spray painting of objects, such as car bodies and the like, in spray chambers or booths, the resulting paint, lacquer or varnish mist, through an airflow, is brought into contact with circulating water or a water curtain for cleaning purposes, or is removed by other paint mist scrubbers. To prevent any sticky, tacky or adhesive lacquer or paint residues from collecting in the washing system, which could clog the paint mist scrubbers, spraying heads or circulating pumps, use is made of paint detackifying and sedimentation or clarifying agents in the washing water. These agents are used for precipitating and coagulating the paint particles which leave behind an easily removable, non-adhesive, sludge-like residue.

A wide variety of additives, such as caustic soda solution, optionally with mineral oil, with wax dispersions, with silicate and phosphates and also having marble lime hydrate with cellulose and montmorillonite or spectite additives, have been used as coagulating agents, e.g., according to German Pat. Nos. 23 47 068 and 34 21 270. Most recently, paint detackifying agents, more particularly for paints having a high solids proportion, have been used, e.g., according to U.S. Pat. No. 4,564,464, and which contain as the essential components bentonites and, in particular, hectorite, which for economic reasons, are blended with mont-morillonite clays or alumina and which contain conventional foam additives, such as foam inhibitors and other coagulating agents.

All the hitherto known paint detackifying agents have suffered from the disadvantages that they respond differently to different paints, e.g., paints based on nitrocellulose, polyacrylate, polyester or polyurethane and waxes, or are uneconomical in combination with the presently used high-solids paints and lacquers, and must therefore be used in a quantity of up to 50% by weight, based on the sprayed paint weight. In addition, the hitherto known paint detackifying agents have included multicomponent mixtures, the preparation and formulation of which are complicated and which, in the case of prolonged storage, can lead to a separation of the components.

It is, therefore, an object of the present invention to provide a novel paint detackifying and sedimentation or clarifying agent which permits the detackification of all types of paints presently in use, particularly those utilized in the automotive industry, which may be formulated and used in an economical manner and which can be prepared in a simple fashion.

The foregoing and related objects are achieved by a paint detackifying agent which includes 60-80%, by weight of alumina ($Al_2O_3$) in pseudo-boehmite or boehmite form. The foregoing component may be either in X-ray amorphous form or have a crystallite size of 20-150 Å. Preferably, the paint detackifying agent of the present invention is used in a quantity of 1% to 10% by weight, based upon the weight of the paint to be detackified. The detackifying agent of the invention is preferably supplied to the circulating water of a paint spraying booth as a 5-30% aqueous dispersion or in dry form.

It has surprisingly been discovered that the paint detackifying agent, according to the invention, containing 60% to 80%, by weight, of alumina ($Al_2O_3$) in pseudo-boehmite or boehmite form, either X-ray amorphous form or with a crystallite size of 20 to 150 Å, is effective in much smaller quantities as compared with bentonite, and has universal applicability to a wide variety of lacquers, varnishes, paints or other sprayable coating media.

Particular preference is given to alumina which can be dispersed in water or acids and which is obtained by aluminum hydroxide hydrolysis in the pH-range of 1 to 11. Most desirably the alumina has a particle size of 10 nm to 1000 nm.

The inventive paint detackifying agents, whose main component is 60% to 80% by weight of dispersible alumina, can also contain 20% to 40% by weight water, which is, in part, crystallographically or physically bound. In addition, the inventive paint detackifying agents can contain 0 to 10 and, preferably, 3% to 6% by weight of acids, such as hydrochloric, nitric, formic, acetic, lactic, chloracetic and/or propionic acid and requiring, as the counter-ion, the corresponding equivalent quantity of aluminum ions or alumina. The paint detackifying agents can, optionally, also contain conventional anti-foam agents.

For producing the dispersible alumina, hydrolyzation takes place either of the aluminum alkoxides, produced during synthetic fatty alcohol production according to Ziegler, the so-called Alfol process, or those produced by direct synthesis according to German Pat. No. 32 44 972, in a pH-range of 1 and 9 and, preferably 6 to 9, with water. An alumina dispersible in dilute acids is obtained, i.e., alumina agglomerates, which can be decomposed into its primary dilute acids, such as e.g., hydrochloric, nitric, acetic, formic, propionic, chloracetic and lactic acid.

Instead of dispersing the aluminas obtained in acid, the particular acids can be directly applied to the alumina agglomerates and, in this way, aluminas directly dispersible in water are used.

The alumina can also be produced by attaching the gaseous acids according to German Pat. No. 24 08 233.

If electrolyte-free dispersions are used, the hydrolyzed aluminas can also be processed to electrolyte-free dispersions by using high shear forces, such as, e.g., by means of colloid mills.

The aluminas produced by hydrolysis can, in the case of a corresponding treatment, also be produced by precipitation from aluminate and aluminum salts.

The aluminas used in the pseudo-boehmite or boehmite structure either have an X-ray-amorphous character or a primary crystallite size of 20 to 150 Å, measured at 1.2.0-reflex by means of X-ray diffraction. The particles in the dispersion have a size in the range of 10 nm to 1000 nm and preferably 90% by weight are in a range of 10 nm to 100 nm.

The present invention will now be described in further detail with reference being made to the following examples and drawing. It should, however, be recognized that such examples are given by way of illustration and are not intended to define the scope of the invention.

BRIEF DESCRIPTION OF THE DRAWINGS

The drawing is a graph of the results of comparison testing wherein detackifying agent percent per kg of paint was plotted against the total sprayed paint quantity in kg for detackifying agents "A," "B" and "C"; the latter being an agent prepared according to the invention.

EXAMPLE 1

25 kg of pseudo-boehmite alumina from neutral aluminum alkoxide hydrolysis were sprayed with 4 kg of a 37% hydrochloric acid and mixed.

The product obtained was once added in a 20% dispersion and once in dry form to the circulating water of a paint spraying booth. The dispersible alumina used contained 60% by weight $Al_2O_3$, 35% by weight $H_2O$ and 5% by weight chloride ions.

The test spray chamber used was a conventional laboratory chamber having a circulating water container with a capacity of 240 liters. The water was circulated at a flow rate of 200 l/min. The airspeed in the chamber was 0.5 m/s. The paint was sprayed in under a pressure of 5 bar using a K960 spraying nozzle of a Benks 920 spray gun.

The paint type used was known under the name "Becker 880DJ White", which consisted of a butylglycolate, alkyl and melamine resin mixture dissolved in organic solvents.

In each case the sprayed paint quantity was determined and also the amount of detackifying agent required per kg of paint in order to obtain complete detackification.

For comparison purposes, testing also took place with detackifying agent "C" and two different bentonite systems, namely a bentonite A (trade mark "IPAFLOC") and a bentonite B (Henkel KgaA Product VR 7821-2). The results are given in FIG. 1, in which are plotted the total sprayed paint quantity in kg and the detackifying agent percentage per kg of sprayed paint necessary for complete sedimentation.

The testing was carried out in a test chamber wherein no objects were being sprayed with paint, the indicated paint quantity corresponds to the paint quantity not applied when actual painting takes place, i.e. the so-called "over-spray".

In addition, the test was carried out in the test spray chamber so that on a per-kg-of-paint basis, approximately 30 g to 40 g of alumina were dosed into the circulating water tank and stirred. Continuous spraying then took place, such spraying being approximately 3 kg/h of paint from the spray gun into the chamber until the paint was sticky. This was manually tested by pressing the sludge. On reaching this point, the paint consumption was noted and the new alumina or bentonite comparison products were added. This process was repeated several times.

It was discovered that in the case of inventive agent C, 3% to 4% by weight of active substance per kg of sprayed paint were sufficient, whereas in the case of comparison agents A and B, approximately 9% to 10% by weight per kg of paint were required to obtain the same effect.

The graph clearly shows the much better behavior of the inventive paint detackifying agent, as compared with commercially available bentonites, whereof roughly 3 times the quantity had to be used to obtain the same effect.

EXAMPLE 2

The various paints according to Table I were treated in accordance with Example 1 and their behavior is given in the following Table (I).

TABLE I

| Paint | Composition |
|---|---|
| A | Alkyd/melamine resins, dissolved in organic solvents |
| B | Mixture of polyester resins and polyvinyl butyrol (with metal effect) |
| C | Urethane "anti-chip primer", mixture of polyurethane resins and organic solvents |
| D | Acrylic resin/melamine resin mixture in organic solvents ("European Acrylic Clear coat") |
| E | Acrylic resin with isocryanate curing agents in organic solvents ("U.S. Acrylic Clear Coat") |
| F | Alkyd resin/melamine resin mixture in organic solvents ("Alkyd/Melamine Orange") |
| G | Mixture of resins in water ("Waterbased Metallic Atlas Grey") |
| H | Butylglycolate/alkyd resin - melamine resin mixture in organic solvents ("Basecoat, White, Becker 880 DO2") |
| I | Acrylic resin with isocyanate curing agent in organic solvents ("2-Component Urethane Clearcoat") |

The following Table II explains the behavior of the different detackifying agents by observations and in general terms in the following way:

| | |
|---|---|
| + | Detackification of paint. |
| + + | Detackification and sedimentation of paint. |
| + + + | Detackification and sedimentation of paint, good dispersibility of paint and sludge. |
| − | Inadequate detackification. |

The addition of a foam inhibitor, such as e.g., the antifoam produced by Diamond Shamrock under the name Foamaster 226, and conventional polymeric deflocculating agents such as Praestol 2415, were helpful in some cases, but not absolutely necessary.

TABLE II

| Paint | With Alumina According to the Invention | With Bentonite Clays |
|---|---|---|
| A | + + + <br> good detackification | + + <br> Agglomeratable, but difficult to pump |
| B | + + + <br> good detackification | + + <br> satisfactory |
| C | + + + <br> good detackification and suspended | − <br> very tacky |
| D | + + + <br> no problem | +/− <br> slightly tacky sticky sediment |
| E | + + + <br> good detacification with somewhat higher consumption | − <br> very tacky |
| F | + + + <br> good detacification | + + <br> acceptable detackification |
| G | + + + <br> longer sedimentation time when foam inhibitors missing | + + <br> longer sedimentation time |
| H | + + + <br> excellent dispersion and good detackification | − <br> tacky, not sedimented |
| I | + + + <br> good detacification, but somewhat higher consumption | − <br> extremely tacky. |

While only several examples and comparison examples have been shown and described, it will be obvious to those of ordinary skill in the art that many modifications may be made to the present invention without departing from the spirit and scope thereof.

What is claimed is:

1. A process for paint detackification and sedimentation, comprising the step of:
adding a composition comprising from 60% to 80% by weight of alumina in a form selected from the group consisting of boehmite and a pseudo-boehmite, in an x-ray amorphous form or crystallite size of 20 to 150 Å and respectively 20–40% water which is at least partially crystallographically or physically bound as a 5–30% of aqueous dispersion or a dry form, to the circulating water of a paint spraying booth, in a quantity of 1–10% by weight based on 1 kg of paint to be detackified, said percentage by weight based on the total weight of the composition.

2. The process for paint detackification and sedimentation according to claim 19, further comprising the step of treating and composition with up to 10% by weight of an acid selected from the group consisting of hydrochloric acid, nitric acid, formic acid, propionic acid, chloroacetic acid, lactic acid and a combination thereof, in order to improve dispersibility.

3. The process for paint detackification and sedimentation according to claim 2, wherein said treating step utilizes 3–6% by weight of said acid based upon the weight of said composition.

4. The process for paint detackification and sedimentation according to claim 1, wherein approximately 90% by weight of particles of said composition, when in said aqueous dispersion, have a size in the range of 10 nm to 100 nm.

5. The process for paint detackification and sedimentation according to claim 1, further comprising the step of adding a foam inhibitor.

* * * * *